(12) United States Patent
Landon et al.

(10) Patent No.: US 9,527,960 B2
(45) Date of Patent: Dec. 27, 2016

(54) METHOD FOR EXTRACTING OIL FROM A POWDER

(71) Applicant: Dow Global Technologies LLC, Midland, MI (US)

(72) Inventors: Robert S. Landon, Livingston, TX (US); Charles M. Vanek, Oxford, PA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/763,324

(22) PCT Filed: Feb. 28, 2014

(86) PCT No.: PCT/US2014/019185
§ 371 (c)(1),
(2) Date: Jul. 24, 2015

(87) PCT Pub. No.: WO2014/149515
PCT Pub. Date: Sep. 25, 2014

(65) Prior Publication Data
US 2015/0376333 A1    Dec. 31, 2015

Related U.S. Application Data

(60) Provisional application No. 61/802,831, filed on Mar. 18, 2013.

(51) Int. Cl.
| | | |
|---|---|---|
| *C08F 8/00* | (2006.01) | |
| *C08G 61/02* | (2006.01) | |
| *C08G 65/30* | (2006.01) | |
| *C10G 1/04* | (2006.01) | |
| *C10G 1/08* | (2006.01) | |
| *B01D 15/08* | (2006.01) | |

(52) U.S. Cl.
CPC ............... *C08G 65/30* (2013.01); *B01D 15/08* (2013.01); *C10G 1/04* (2013.01); *C10G 1/086* (2013.01)

(58) Field of Classification Search
CPC ............ C10G 1/04; C10G 1/086; B01D 15/08
USPC .............................. 525/122, 55; 524/1; 523/1
See application file for complete search history.

(56) References Cited

U.S. PATENT DOCUMENTS

| | | |
|---|---|---|
| 5,911,541 A | 6/1999 | Johnson |
| 6,889,399 B2 | 5/2005 | Steiner et al. |
| 7,482,021 B1 | 1/2009 | Tison et al. |
| 7,673,757 B2 | 3/2010 | Yavorsky |
| 2010/0072110 A1* | 3/2010 | Gradek ..................... C10G 1/04 208/390 |

FOREIGN PATENT DOCUMENTS

CN        101596381 A        12/2009

OTHER PUBLICATIONS

Search report from corresponding Chinese 201480012106.1 application, dated Apr. 19, 2016.

* cited by examiner

*Primary Examiner* — David Karst
(74) *Attorney, Agent, or Firm* — Steven W. Mork

(57) ABSTRACT

A process includes: (a) providing a powder containing hydrophilic particulates and hydrocarbon liquid; (b) providing polyolefin beads; and (c) forming a combination by combining the polyolefin beads with the powder.

9 Claims, No Drawings

METHOD FOR EXTRACTING OIL FROM A POWDER

BACKGROUND OF THE INVENTION

Field of the Invention

The present invention relates to a method for extracting oil from a powder.

Introduction

Preparation and/or processing of powders comprising hydrophilic particles (that is, hydrophilic powders) can involve exposure of the hydrophilic particles to liquid hydrocarbons. It can be difficult to remove liquid hydrocarbons from the hydrophilic powder. It can be especially difficult to remove the last trace amounts of liquid hydrocarbons, trace amounts referring to amounts less than one weight-percent (wt %) based on total powder weight. In some applications, such as in the pharmaceutical industry, even trace amounts of hydrocarbon in hydrophilic powders can be undesirable. Therefore, there is a need for a method of efficiently extracting liquid hydrocarbons from hydrophilic powders even at trace and sub-trace amount.

BRIEF SUMMARY OF THE INVENTION

The present invention provides a method for extracting hydrocarbons from powders of hydrophilic particles (that is, hydrophilic powders). The method surprisingly is efficient at even reducing trace amounts of hydrocarbons in hydrophilic powders.

The present invention is a result of discovering that exposing hydrophilic powders containing hydrocarbon liquids, even just trace amounts, to polyolefin particles causes hydrocarbon liquids to combine with (that is adsorb onto or absorb into) the polyolefin particles. Subsequent filtering of the hydrophilic powder away from the polyolefin particles extracts hydrocarbon liquids from the hydrophilic powder.

In a first aspect, the present invention is a process comprising: (a) providing a powder comprising hydrophilic particulates and hydrocarbon liquid; (b) providing polyolefin beads; and (c) forming a combination by combining the polyolefin beads with the powder.

The present invention is useful for extracting hydrocarbon liquids from hydrophilic powders.

DETAILED DESCRIPTION OF THE INVENTION

"Multiple" means two or more. "And/or" means "and, or as an alternative". All ranges include endpoints unless otherwise indicated. The present invention is a process that requires providing a powder. The powder comprises hydrophilic particulates. "Hydrophilic" characterizes a substance that has a contact angle of less than 90 degrees with deionized water and/or absorbs water. Hence, the hydrophilic particulates are made of a substance that absorbs water and/or has a smaller than 90 degree contact angle with deionized water. The hydrophilic particles can be soluble in water. Herein, "water" refers to deionized water at pH 7 unless otherwise indicated. For example, the hydrophilic particulates can be particulates of polyethylene oxide. Desirably, the powder comprises more than 50 weight percent (wt %) hydrophilic particulates based on powder weight. Preferably, the powder is 95 wt % or more, more preferably 98 wt % or more, still more preferably 99 wt % or more and can be 99.5 wt % or more hydrophilic particles based on total powder weight.

The powder also comprises hydrocarbon liquid. The hydrocarbon liquid is a "liquid" at the temperature that the process is conducted, the temperature of the extraction. Typically, the hydrocarbon is a liquid at 20 degrees Celsius. The hydrocarbon liquid is typically adsorbed onto the hydrophilic particulates. Additionally, or alternatively, the hydrocarbon liquid can reside as a separate phase between hydrophilic particulates. The process of the present invention is most effective when the concentration of hydrocarbon liquid is two wt % or less, preferably one wt % or less, still more preferably 0.75 wt % or less and can be 0.5 wt % or less. The process is particularly effective at removing hydrocarbon liquids present as trace amounts, that is less than one wt %, in the powder. Wt% of hydrocarbon is relative to total powder weight. Even at such low concentrations of hydrocarbon liquid, the process of the present invention is useful for extracting hydrocarbon liquid from the hydrophilic particulates of the powder. Moreover, the process of the present invention is useful for extracting hydrocarbon liquid from the hydrophilic particulates of the powder without adding any additional liquid (for example, solvent) to the powder. Preferably, the process of the present invention is free from adding liquid to the powder.

The process further comprises providing polyolefin beads. The polyolefin beads comprise, preferably consist of, one or more than one polyolefin. The polyolefin can be an olefinic copolymer or olefinic homopolymer. The polyolefin can be a hydrocarbon. The polyolefin desirably has an affinity for the hydrocarbon liquid in the powder, meaning the hydrocarbon liquid desirably preferentially adsorbs onto and/or absorbs into the polyolefin bead over adsorbing to the hydrophilic particulates of the powder. Examples of desirable polyolefins include those selected from a group consisting of ethylene-octene copolymer, low density polyethylene, very low density polyethylene, linear low density polyethylene, crosslinked polyethylene and ethylene-vinyl acetate copolymer.

Form a combination by combining the polyolefin beads with the powder. Herein, "bead" is a general term that corresponds to particles of any size and shape including pellets. The process can include mixing the polyolefin beads into or with the powder and/or some other form of agitation in order to disperse the polyolefin beads and powder together, thereby intermixing the hydrophilic particulates of the powder and polyolefin beads. To be most effective, the process should cause polyolefin beads to come into contact with as much of the hydrocarbon liquid in the powder as possible. It is also desirable to for the combination to be as homogeneous as possible, meaning the polyolefin beads and hydrophilic particulates are thoroughly dispersed with one another.

The hydrocarbon liquid tends to adsorb onto and/or absorb into the polyolefin beads when exposed to the polyolefin beads. Therefore, it is desirable to optimize the likelihood of exposing the polyolefin beads to the hydrocarbon liquid in the powder. For example, it is desirable to allow the combination of polyolefin beads and powder to exist for a period of time with longer periods of time being more desirable than shorter. Additionally, it is desirable to heat or warm the combination to render the hydrocarbon liquid more mobile so it is more likely to become exposed to polyolefin beads in the combination.

The polyolefin beads extract the hydrocarbon liquid from the powder in the combination. It is further desirable for the process of the present invention to include separation of the polyolefin beads from the hydrophilic powder after the beads have extracted liquid hydrocarbon. The process can comprise essentially any separation technique. However, separation by sieving is a particularly desirable method. In that regard, it is desirable for the hydrophilic particulates and the polyolefin beads to have different sizes that enable separation by sieving. Sieving is a method for separating particles of different size by placing a combination of particles on a screen (or mesh or like article, such as a sieve) having openings of a particular size and allowing particles having dimensions smaller than the openings pass through the screen while retaining particles having a dimension greater than the opening from passing through the screen. Often, sieving involves agitating the combination of particles on the screen to facilitate separation.

The process of the present invention, in its broadest sense, can comprise hydrophilic particulates of any size and polyolefin beads of any size. However, it is desirable for the hydrophilic particulates to be either larger or smaller than the polyolefin beads to facilitate separation of the particulates from the beads by sieving. A particulate (or bead) is larger than a bead (or particulate) if the former has a larger dimension than the latter. For example, it is typical for the hydrophilic particulate to have a largest dimension of less than two millimeters (mm), more typically 1.5 mm or less, and yet more typically one mm or less. At the same time, or alternatively, it is typically for the polyolefin beads to have a largest dimension of greater than two mm, more typically 2.5 mm or more, yet more typically three mm or more. Determine the largest dimension of a particulate or bead by measuring the largest dimension by micrometer or a higher resolution method of 50 particulates or beads and taking the average of those measurements to represent the largest dimension of the particulates or beads.

Extraction of hydrocarbons from the hydrophilic powder is expected to be an equilibrium controlled process. The amount of hydrocarbon that the polyolefin beads can extract from a hydrophilic powder is ultimately controlled by the amount of time that the polyolefin bead and hydrophilic powder are in contact up to such time as extraction equilibrium is reached, and the weight ratio of polyolefin beads to hydrophilic powder. The rate at which equilibrium is reached is dependent upon surface area of the hydrophilic powder particles and polyolefin beads as well as the temperature of the mixture and how thoroughly the beads and powder are intermixed. Increasing surface areas, temperature and/or extent of dispersion all reduce the time needed to reach equilibrium. It is desirable to reach equilibrium before separating the polyolefin beads from the hydrophilic powder in order to maximize hydrocarbon extraction.

EXAMPLES

In the following examples the powder consists of 100 grams of polyethylene oxide (PEO) particulates and 0.3-0.4 wt % mineral oil (containing hydrocarbons of 12, 13 and 14 carbons—that is, C12, C13 and C14 hydrocarbons) based on powder weight. The PEO powder has approximately spherical particulates having a diameter that is less than one millimeter. For example, the PEO powder can be POLYOX™ water-soluble polyethylene oxide polymer powder (POLYOX is a trademark of The Dow Chemical Company).

Comparative Example (Comp Ex) A

Place the powder into a glass jar and cap the jar. Place the jar in an oven at 50 degrees Celsius (° C.). Remove a sample of the PEO particulates upon placing the powder into the jar, after one week in the oven and after two weeks in the oven. Determine the concentration of mineral oil in the powder sample by extracting the PEO particles with acetone and analyzing by gas chromatography by measuring the combined concentration corresponding to the C12, C13 and C14 hydrocarbon peaks in the chromatograph. Results are in Table 1.

Example (Ex) 1

Repeat Comp Ex A except mix into the powder two grams of ethylene/octene copolymer pellets having an largest dimension of 3 millimeters (for example ENGAGE™ 820 resin pellets, ENGAGE is a trademark of The Dow Chemical Company) before setting the jar in the oven. Determine concentration of mineral oil in the powder by removing only powder samples after one week and two weeks. Results are in Table 1.

Example (Ex) 2

Repeat Ex 1 except use polyolefin pellets of linear low density polyethylene instead of ethylene/octene copolymer. Results are in Table 1.

The data in Table 1 reveals that in an absence of polyolefin beads there is a minimal reduction in hydrocarbon in the powder. However, when polyolefin beads are present there is a significant reduction in hydrocarbon in the powder. The data also reveals the surprisingly efficient extraction ability of the ethylene/octene copolymer relative to the linear low density polyethylene.

TABLE 1

| Sample | Hydrocarbon Concentration (parts per million by weight based on powder weight) | | |
| --- | --- | --- | --- |
| | At Start | 1 Week | 2 Weeks |
| Comp Ex A | 3972 | 3608 | 3585 |
| Ex 1 | 3943 | 1580 | 799 |
| Ex 2 | 3969 | 2449 | 2070 |

Example (Ex) 3

Repeat Ex 1 except leave the jar at 20° C. instead of placing it in the oven at 50° C. and roll the jar to mix the contents periodically. Measure the concentration of hydrocarbon in the powder by sampling powder just prior to adding polyolefin pellets, 2 hours after adding polyolefin pellets, 4 hours after adding polyolefin pellets and 18 hours after adding polyolefin pellets. At the start there was 3870 parts per million (ppm) mineral oil in the powder, after 2 hours 2813 ppm, after 4 hours 2512 ppm and after 18 hours 1902 ppm. Hence, the polyolefin pellets efficiently extracted hydrocarbon oil from the powder even without heating and in a matter of hours reduced the concentration in half from 3870 ppm to 1902 ppm. Parts per million are by weight of powder weight.

The invention claimed:
1. A process comprising: (a) providing a powder comprising hydrophilic particulates and hydrocarbon liquid; (b) providing polyolefin beads consisting of one or more than one polyolefin; and (c) forming a combination by combining the polyolefin beads with the powder wherein the hydrophilic particulates are water soluble.

2. The process of claim 1, further comprising allowing the combination to exist for a period of time and then removing the polyolefin beads with at least a portion of the hydrocarbon liquid bound thereto.

3. The process of claim 2, further characterized by the polyolefin beads having a larger dimension than the hydrophilic particulates and further comprising sieving the combination to separate the smaller hydrophilic particulates from the polyolefin beads.

4. The process of claim 1, further characterized by the powder comprising the hydrophilic particulates in an amount of at least 95 wt % based on total weight of the powder.

5. The process of claim 1, further characterized by the polyolefin beads on average having a largest dimension of greater than two millimeters and the hydrophilic particulates having a largest dimension of less than two millimeters.

6. The process of claim 1, further characterized by heating the combination formed in step (c).

7. The process of claim 1, further comprising agitating the combination formed in step (c) thereby intermixing the hydrophilic particulates and polyolefin beads.

8. The process of claim 1, further characterized by the combination comprising less than two weight-percent of the hydrocarbon liquid based on the combination weight.

9. The process of claim 1, further characterized by the hydrocarbon liquid being present in the powder at a concentration of less than one weight-percent based on total powder weight.

* * * * *